United States Patent
Eom et al.

(10) Patent No.: US 11,965,597 B2
(45) Date of Patent: Apr. 23, 2024

(54) PISTON ASSEMBLY, AIR CYLINDER AND APPARATUS FOR PROCESSING SUBSTRATE

(71) Applicant: SEMES CO., LTD., Chungcheongnam-do (KR)

(72) Inventors: Sung Hun Eom, Chungcheongnam-do (KR); Nam Ki Hong, Chungcheongnam-do (KR)

(73) Assignee: SEMES CO., LTD., Chungcheongnam-Do (KR)

(*) Notice: Subject to any disclaimer, the term of this patent is extended or adjusted under 35 U.S.C. 154(b) by 0 days.

(21) Appl. No.: 18/099,942

(22) Filed: Jan. 21, 2023

(65) Prior Publication Data

US 2023/0400097 A1 Dec. 14, 2023

(30) Foreign Application Priority Data

Jun. 8, 2022 (KR) .................. 10-2022-0069218

(51) Int. Cl.
*F16J 1/09* (2006.01)
*F16J 9/12* (2006.01)

(52) U.S. Cl.
CPC .. *F16J 1/09* (2013.01); *F16J 9/12* (2013.01)

(58) Field of Classification Search
CPC ...................................... F16J 9/12; F16J 1/09
USPC ........................................................ 92/158
See application file for complete search history.

(56) References Cited

U.S. PATENT DOCUMENTS

| | | |
|---|---|---|
| 2008/0028923 A1 | 2/2008 | Fujita et al. |
| 2011/0168014 A1* | 7/2011 | Riley .................. F04B 53/143 |
| | | 92/182 |
| 2018/0330910 A1 | 11/2018 | Seki |
| 2019/0049011 A1* | 2/2019 | Svrcek ...................... F16J 9/20 |
| 2020/0362888 A1* | 11/2020 | Leiber .................. B60T 11/236 |

FOREIGN PATENT DOCUMENTS

| | | |
|---|---|---|
| JP | 8-1253 | 1/1996 |
| JP | 8-200314 | 8/1996 |
| JP | 2006-189012 | 7/2006 |
| JP | 2008-39074 | 2/2008 |
| JP | 2020-530541 | 10/2020 |
| KR | 10-2006-0108317 | 10/2006 |
| WO | 2016/080129 | 5/2016 |
| WO | 2019/032894 | 2/2019 |

OTHER PUBLICATIONS

Office Action dated Jan. 22, 2024 for Korean Patent Application No. 10-2022-0069218 and its English translation from Global Dossier.

* cited by examiner

*Primary Examiner* — Michael Leslie
*Assistant Examiner* — Daniel S Collins
(74) *Attorney, Agent, or Firm* — Ladas & Parry, LLP

(57) ABSTRACT

The present disclosure is to provide a piston assembly in which a particle does not leak out of a cylinder, and including, in an embodiment, a piston body; a piston rod connected to the piston body; a first groove formed in an outer surface of the piston body; and a particle discharge flow path extending from an internal space of the piston body to the outer surface of the piston body.

17 Claims, 14 Drawing Sheets

A-A'

B-B'

C-C'

PISTON ASSEMBLY, AIR CYLINDER AND APPARATUS FOR PROCESSING SUBSTRATE

CROSS-REFERENCE TO RELATED APPLICATION(S)

This application claims benefit of priority to Korean Patent Application No. 10-2022-0069218 filed on Jun. 8, 2022 in the Korean Intellectual Property Office, the disclosure of which is incorporated herein by reference in its entirety.

BACKGROUND

1. Field

The present disclosure relates to a piston assembly included in an air cylinder, an air cylinder including the piston assembly, and an apparatus for processing a substrate, equipped with the air cylinder.

2. Description of Related Art

An apparatus for processing a substrate commonly requires a door or a slit valve, such as a process chamber or a load lock, for distinguishing each place and receiving and discharging the substrate in order to transport the substrate to a location where there is a vacuum level or a pressure difference, and has an air cylinder to drive the same.

Such an apparatus has a door for opening and closing an inlet/outlet port of a process chamber, and a wafer transfer robot may move the substrate while the door is open, the substrate may be seated in the chamber, and the substrate may be processed while the door is closed. Such a door may be normally operated by an air cylinder, and a basic shape of the air cylinder is illustrated in FIG. 1.

As illustrated in FIG. 1, an air cylinder 20 may include a cylinder body 21 and a piston assembly 22 disposed in the cylinder body 21, and the piston assembly 22 may include a piston body 23, and a rod 24 connected to the piston body 23 to extend in a moving direction, and connected to a door. A sealing ring 25 may be disposed on the outer surface of the piston body 23, and air inlet/outlet ports 26 and 27 may be disposed on both sides of the cylinder body 21 in the moving direction of the rod 24 around the sealing ring 25, and as high-pressure air is supplied to one of the air inlet/outlet ports 26 and 27, an operation of opening or closing the door may be implemented.

The sealing ring 25 may be configured to separate an upper space and a lower space of the piston assembly 22. When the piston assembly 22 moves, since the sealing ring 25 moves while being in close contact with an inner surface of the cylinder body 21, a lubricant may be applied to the inner surface of the cylinder body 21 in order to reduce friction. Since the lubricant is consumed by driving, the lubricant should be supplied at regular intervals.

In addition, in the air cylinder 20, as the piston assembly 22 operates, the sealing ring 25 may be worn. When the lubricant supplied thereto is insufficient, a degree of wear may be severe. In this manner, when the sealing ring 25 is worn It may be formed in the cylinder body 21 and worn particles may be discharged to the outside through the through-hole 21a through which the piston rod 24 passes.

In particular, when environment in which the air cylinder 20 is disposed is poor, for example, when the air cylinder 20 is disposed next to a high-temperature process chamber, it may be difficult to accurately predict a degree of hardening of the sealing ring 25 or a degree of consumption of the lubricant, and accordingly, particles caused by the wear of the sealing ring 25 may leak out of the air cylinder 20 and contaminate surroundings. In addition, there is a possibility that such particles may even contaminate a wafer.

Accordingly, as in Patent Document 1, a technique for covering a cover surrounding the air cylinder 20 has been developed. However, since the technology covers the air cylinder 20 and takes up a significant amount of space, and does not fundamentally remove particles, there is a limit in that contamination due to outflow of the particles remains.

(Patent Document 1) KR 10-2006-0108317 A

SUMMARY

An aspect of the present disclosure is to solve the problems of the prior art, and an object of the present disclosure is to provide a piston assembly in which a particle does not leak out of a cylinder, and an air cylinder and an apparatus for processing a substrate, including the piston assembly.

The present disclosure provides a piston assembly, an air cylinder, and an apparatus for processing a substrate, as follows, in order to achieve the above object.

In an embodiment, the present disclosure provides a piston assembly including a piston body; a piston rod connected to the piston body; a first groove formed in an outer surface of the piston body; and a particle discharge flow path extending from an internal space of the piston body to the outer surface of the piston body.

In an embodiment, the piston assembly may further include a second groove formed in the outer surface of the piston body to be spaced apart from the first groove in a moving direction of the piston body, wherein the particle discharge flow path may be connected to a portion of the outer surface of the piston body between the first groove and the second groove.

In an embodiment, the piston assembly may further include a second groove formed in the outer surface of the piston body to be spaced apart from the first groove in a moving direction of the piston body, and may further include a first connection flow path connecting an inner side surface of the second groove and a side surface in the moving direction of the piston body.

In this case, the piston assembly may further include a sealing ring disposed in the first groove, and a solid lubricant disposed in the second groove.

Alternatively, the piston assembly may include a sealing ring disposed on the first groove; a porous structure having a ring shape and disposed on the second groove; and a lubricant storage space connected to the second groove in an internal space of the second groove, wherein the lubricant storage space is exposed to a side surface in the moving direction of the piston body.

In an embodiment, an air cylinder including a cylinder body; a gas inlet/outlet port connected to the cylinder body; and a piston assembly disposed in the cylinder body, wherein the piston assembly includes a piston body; a piston rod connected to the piston body; a first groove formed in an outer surface of the piston body; a sealing ring disposed in the first groove; a second groove formed in the outer surface of the piston body to be spaced apart from the first groove in a moving direction of the piston body; a solid lubricant having a ring shape and disposed in the second groove; and a particle discharge flow path extending from an internal space of the piston body to a portion of the outer surface of the piston body adjacent to the first groove, wherein the particle discharge flow path extends from the piston body to an internal space of the piston rod, is provided.

In an embodiment, the present disclosure provides an apparatus for processing a substrate, including: a substrate processing chamber including an opening through which the substrate enters and exits; a door opening and closing the opening of the substrate processing chamber; and an air cylinder connected to the door, wherein the air cylinder is the above-mentioned air cylinder.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
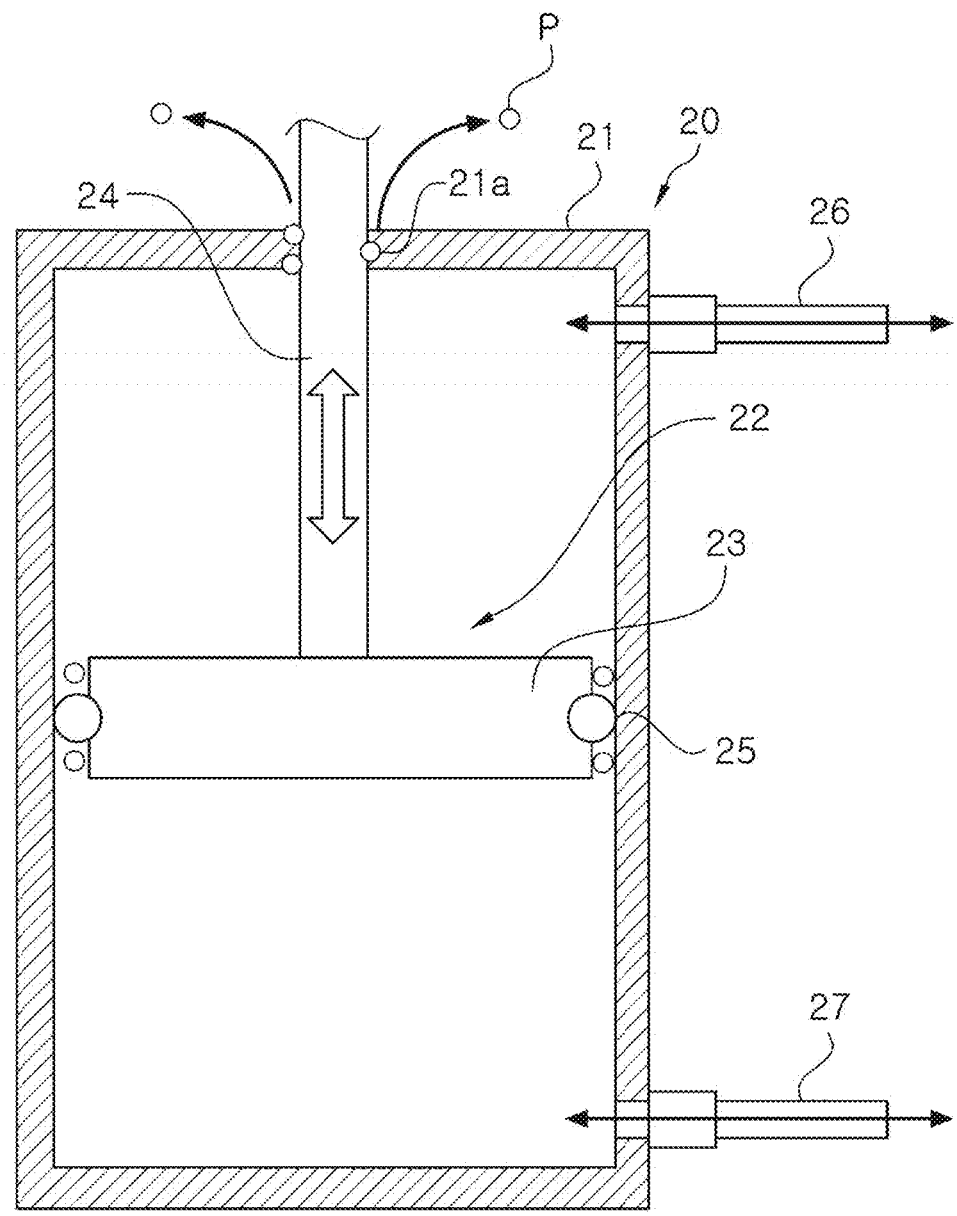
FIG. 1 is a schematic diagram of a conventional air cylinder.

Hereinafter, preferred embodiments will be described in detail such that those skilled in the art may easily practice the present disclosure with reference to the accompanying drawings. However, in describing a preferred embodiment of the present disclosure in detail, if it is determined that a detailed description of a related known function or configuration unnecessarily obscure the gist of the present disclosure, the detailed description will be omitted. In addition, the same reference numerals may be used throughout the drawings for a portion having a similar function and action. In addition, in this specification, terms such as 'on,' 'upper,' 'upper portion,' 'upper surface,' 'below,' 'lower,' 'lower portion,' 'lower surface', and 'side surface' may be based on the drawings, and may be actually vary depending on a direction in which an element or a component is placed.

In addition, throughout the specification, when a portion is said to be 'connected' to another portion, this may include not only a case in which it is 'directly connected,' but also a case in which it is 'indirectly connected' with another element in between. In addition, 'including' a certain component means that other components may be further included, rather than excluding other components, unless otherwise stated.

Figure 2:
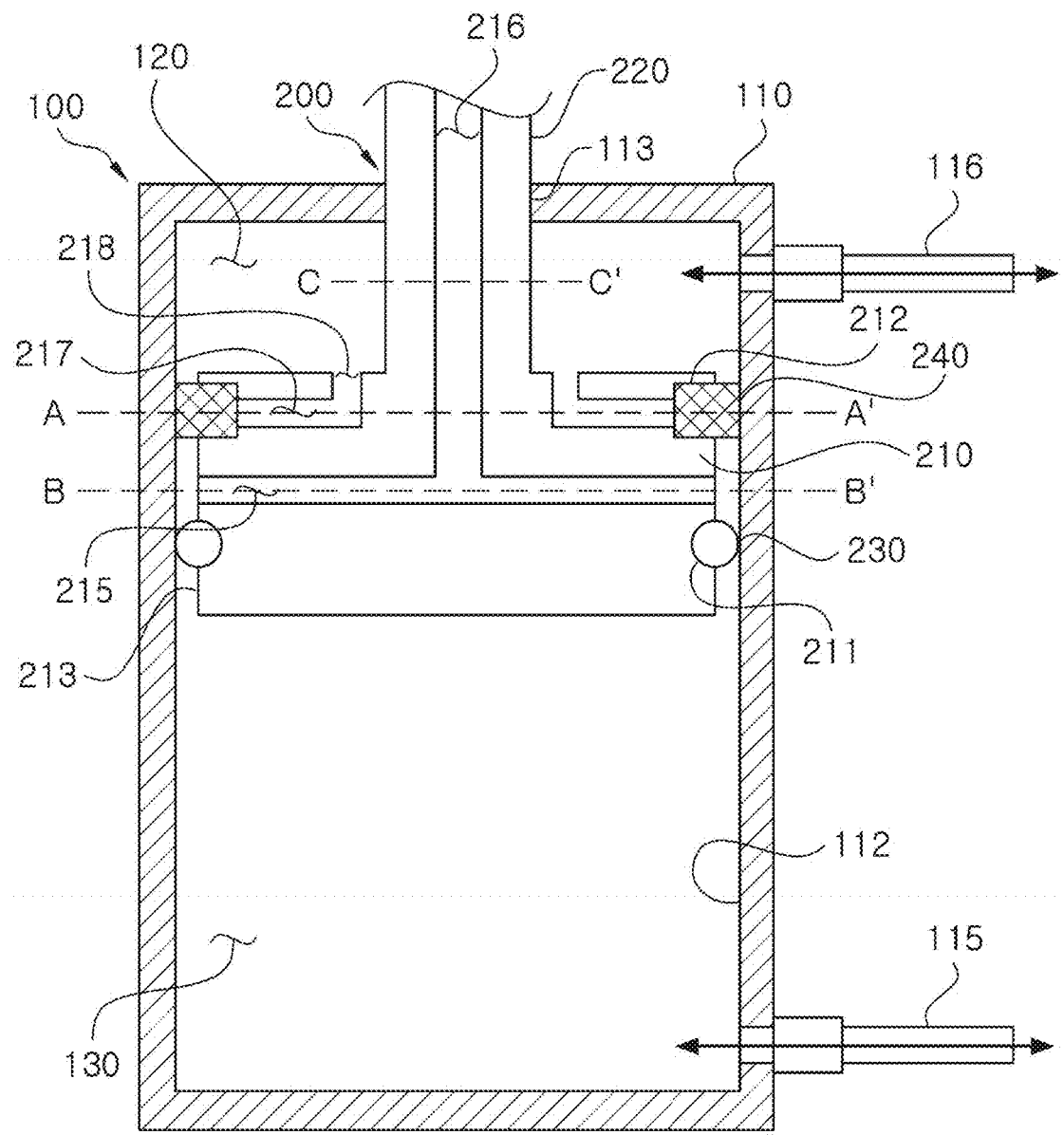
FIG. 2 is a schematic diagram of an air cylinder including a piston assembly of a first embodiment of the present disclosure.
Figure 3:
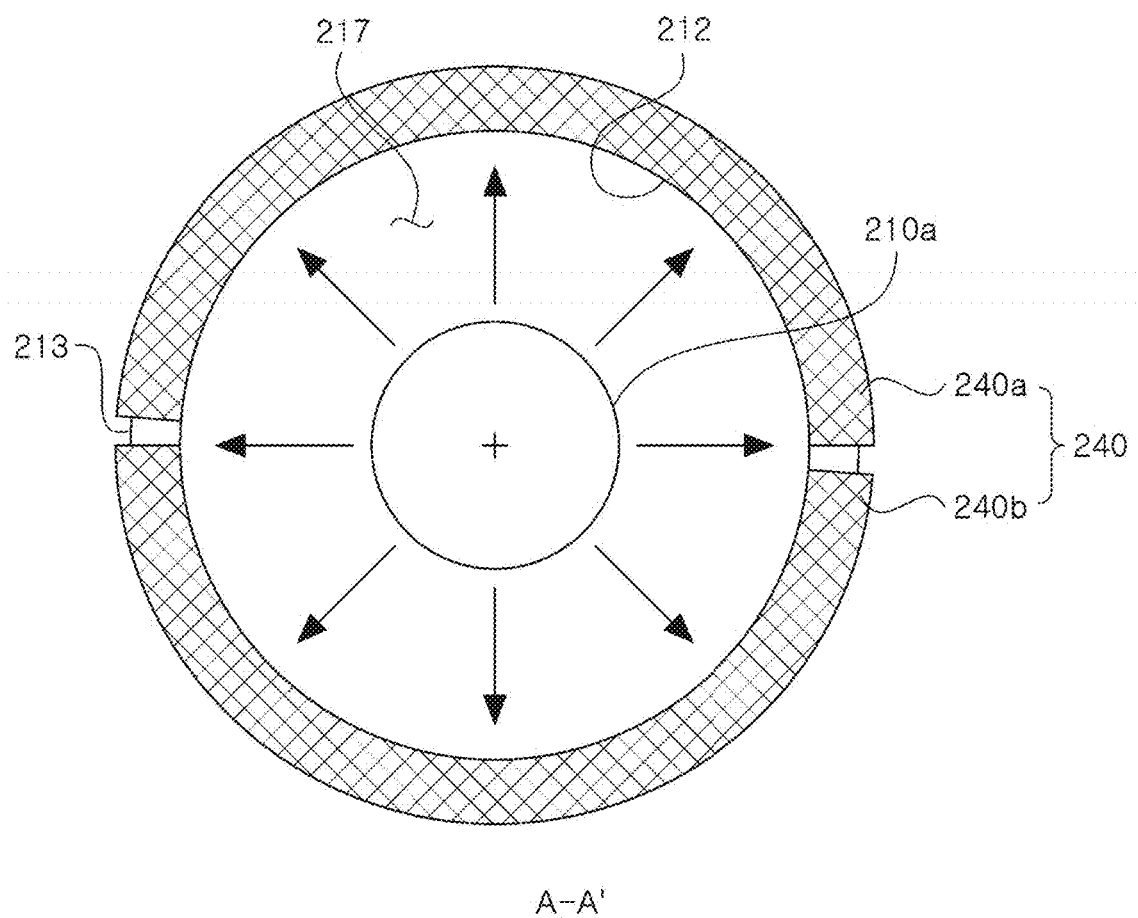
FIG. 3 is a cross-sectional view of the piston assembly of FIG. 2, taken along line A-A'.
Figure 4:
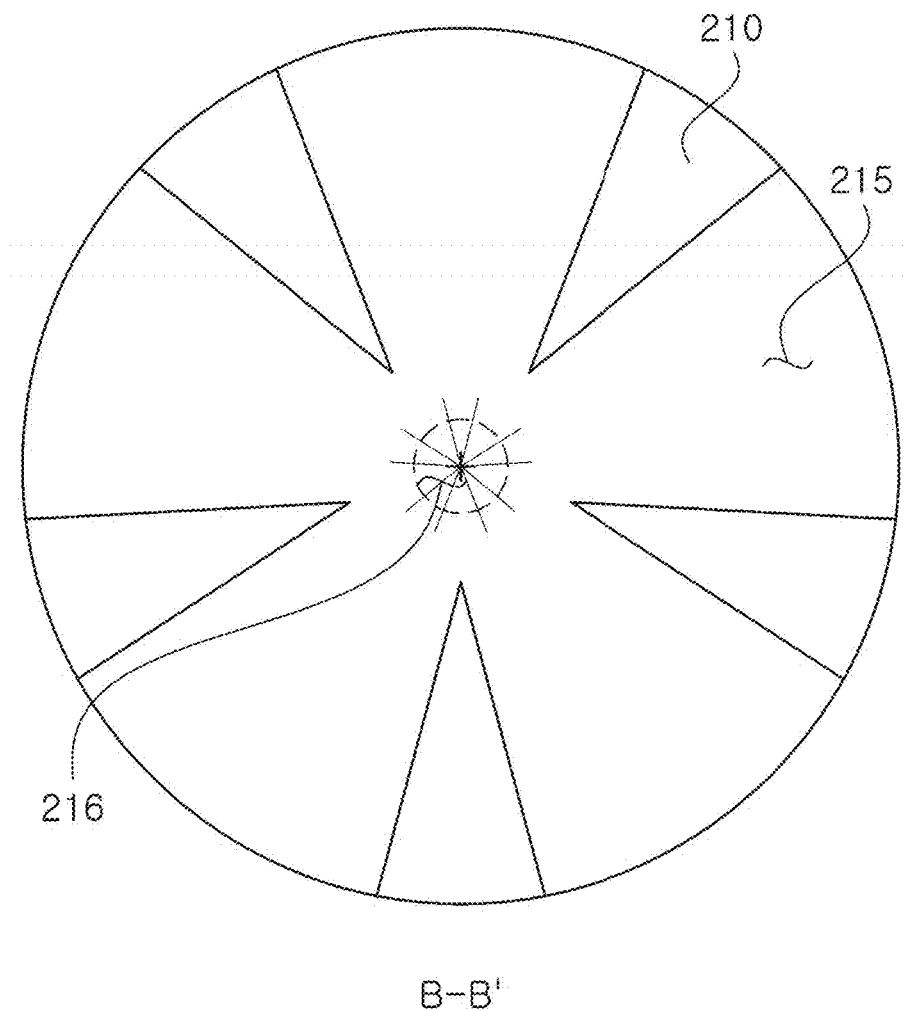
FIG. 4 is a cross-sectional view of the piston assembly of FIG. 2, taken along line B-B'.
Figure 5:
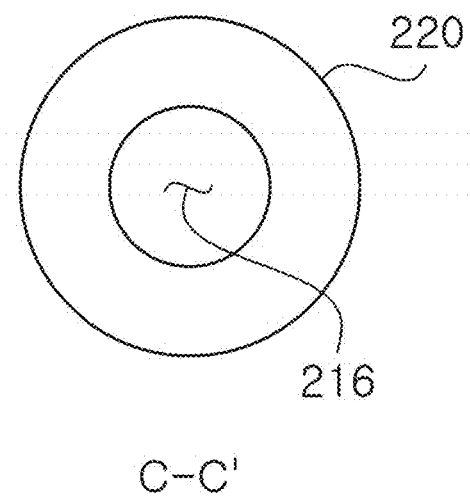
FIG. 5 is a cross-sectional view of the piston assembly of FIG. 2, taken along line C-C'.
Figure 6:
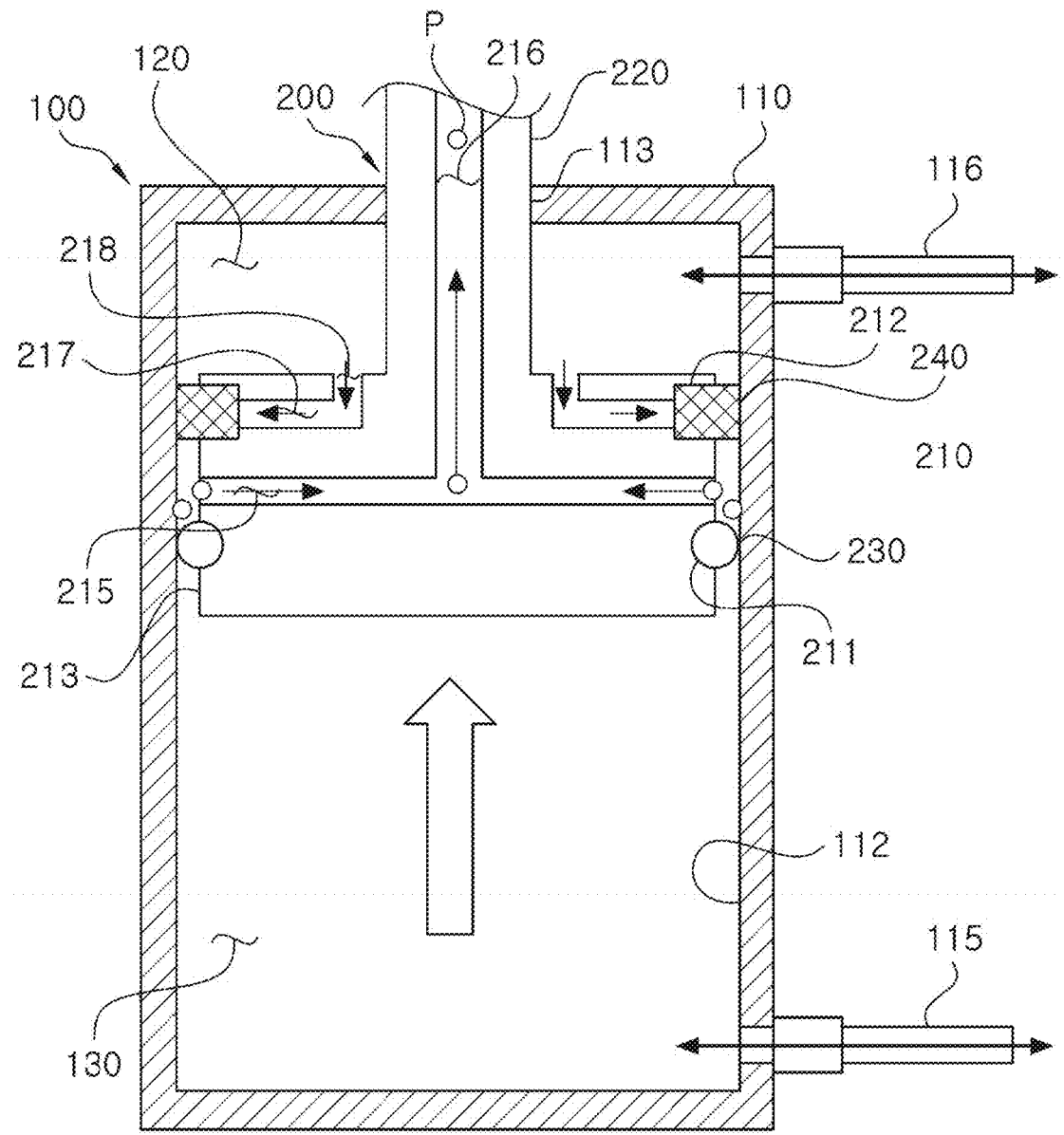
FIG. 6 is a schematic operation diagram of the air cylinder of FIG. 2.

FIGS. 2 to 6 show an air cylinder 100 including a piston assembly 200 according to a first embodiment of the present disclosure. Specifically, FIG. 2 is a schematic diagram of an air cylinder including a piston assembly of a first embodiment of the present disclosure, FIG. 3 is a cross-sectional view of the piston assembly of FIG. 2, taken along line A-A', FIG. 4 is a cross-sectional view of the piston assembly of FIG. 2, taken along line B-B', FIG. 5 is a cross-sectional view of the piston assembly of FIG. 2, taken along line C-C', and FIG. 6 is a schematic operation diagram of the air cylinder of FIG. 2.

As illustrated in FIG. 2, an air cylinder 100 according to an embodiment of the present disclosure may include a cylinder body 110 having a cylindrical internal space, and a piston assembly 200 disposed in the cylinder body 110 and moving in a vertical direction of FIG. 2.

The internal space of the cylinder body 110 may be divided into a first space 120 located in an upper portion and a second space 130 by the piston assembly 200, the cylinder body 110 may have a gas inlet/outlet port 116 communicating with the first space 120, and a gas inlet/outlet port 115 communicating with the second space 130, and a through-hole 113 through which a piston rod 220 of the piston assembly 200 passes may be provided on an upper surface of the cylinder body 110. Although not illustrated, a seal may be provided between the through-hole 113 and the piston rod 220 to prevent gas or particles in the first space 120 from escaping from the air cylinder 100 externally.

In this embodiment, it is described that the piston assembly 200 is moved in the vertical direction, but the moving direction of the piston rod 220 may be changed according to an arrangement of the air cylinder 100, of course. One direction in a moving direction of the piston assembly 200 may be referred to as an upper portion or an upper side, and the other direction in the moving direction may be referred to as a lower portion or a lower side.

The piston assembly 200 disposed in the cylinder body 110 may include a piston body 210 having an outer diameter, smaller than an inner diameter of the cylinder body 110, a piston rod 220 connected to one side of the piston body 210 in a moving direction, e.g., an upper side in FIG. 2, particle discharge flow paths 215 and 216 extending from the piston body 210 to the piston rod 220, a first groove 211 formed concavely radially inward from an outer surface of the piston body 210, and a second groove 212 formed spaced apart from the first groove 211 in the moving direction.

In the present disclosure, the grooves means that the piston body 210 has a diameter of at least one portion, smaller than the outer diameter of the piston body 210, in the moving direction, and is connected as a whole in a circumferential direction, and an inner surface of the groove may be discontinuous or may be irregular.

The piston assembly 200 may include a sealing ring 230 disposed in the first groove 211, and a solid lubricant 240 disposed in the second groove 212. The sealing ring 230 may distinguish the first space 120 and the second space 130, and when the piston assembly 200 moves, the sealing ring 230 may have a material having elasticity to move in close contact with an inner surface 112 of the cylinder body 110, and may have a ring shape.

As illustrated in FIG. 3, the solid lubricant 240 may have a ring shape as a whole, and may be divided into a plurality of portions in the circumferential direction. For example, the solid lubricant 240 may include a plurality of portions 240a and 240b constituting a portion of the ring shape. The solid lubricant 240 may include half ring-shaped portions 240a and 240b in FIG. 3, but is not limited thereto, and may be divided in various numbers. The portions 240a and 240b of the solid lubricant 240 may be disposed such that end portions thereof come into contact with each other, thereby forming a space between the solid lubricant 240 and the sealing ring 230. In the sealing ring 230, even though particles are generated, the particles may be primarily gathered in the space, and particle discharge flow paths 215 and 216, which will be described later, may be connected to this space, such that the particles may be easily removed.

In addition, in the solid lubricant 240, the solid lubricant 240 may be configured as a whole of the portions 240a and 240b, or may include a configuration in which a base material and an outer surface of the base material are coated with a solid lubricant. A solid lubricant may include a thermoplastic such as graphite, molybdenum disulfide ($MoS_2$), mica, talc, polytetrafluoroethylene (PTFE), polyamide, or polyethylene, but is not limited thereto.

An outer diameter of the solid lubricant 240 may be greater than a diameter of an outer surface 213 of the piston body 210, and may preferably correspond to the inner surface 112 of the cylinder body 110. The solid lubricant 240 may be in close contact with the inner surface 112, and a particle of the solid lubricant 240 may be rubbed against the inner surface 112 to reduce friction, when the sealing ring 230 moves, while being in close contact with the inner surface 112.

Connection flow paths 217 and 218 may be formed such that the second groove 212 on which the solid lubricant 240 is seated communicates with a surface of the piston body 210 on which the second groove 212 is located, based on the sealing ring 230, in the moving direction. The connection flow paths 217 and 218 are illustrated in FIG. 2 as including a radial direction connection flow path 217 extending radially from the second groove 212, and a moving direction connection flow path 218 exposed to the first space 120 while extending from the radial direction connection flow path 217 in the moving direction, but are not limited thereto, and any method thereof may be selected as the first space 120 and the internal space of the second groove 212 are connected.

As illustrated in the cross-section A-A' of FIG. 3, the radial direction connection flow path 217 may be a space formed, excepting a portion 210a of the piston body 210, and the second groove 212 and the radial direction connection flow path 217 may be also integrated. As in FIG. 2, there may be a boundary between the second groove 212 and the radial direction connection flow path 217. Alternatively, the second groove 212 and the radial direction connection flow path 217 may be connected without a boundary.

The particle discharge flow paths 215 and 216 may be connected to a portion of the outer surface 213 of the piston body 210 between the first groove 211 and the second groove 212. The particle discharge flow paths 215 and 216 may include a first particle discharge flow path 215 extending in the radial direction of the piston body 210, and a second particle discharge flow path 216 extending in the moving direction of the piston assembly 200. The second particle discharge flow path 216 may extend into the piston rod 220 along a center line of the piston assembly 200, and the first particle discharge flow path 215 may connect the second particle discharge flow path and a portion between the outer surface 213 of the piston body 210 and the inner surface 112 of the cylinder body 110.

As illustrated in the cross-section B-B' of FIG. 4, the first particle discharge flow path 215 may be formed in an entire region of a cross-section except for a portion 210b connecting upper and lower portions of the first particle discharge flow path 215 in the piston body 210, and may be configured to gradually widen from a center toward the outer surface 213 in the cross-section. The center of the first particle discharge flow path 215 may be connected to the second particle discharge flow path 216.

As illustrated in the cross-section C-C' of FIG. 5, the second particle discharge flow path 216 may extend along a center of the piston rod 220. The second particle discharge flow path 216 may be connected to a suction device or a negative pressure forming device, located externally, through the piston rod 220 or an object connected to the piston rod 220, and may become a passage for suctioning air in a space between the piston body 210 and the cylinder body 110. Therefore, when a particle P is generated from the sealing ring 230, the particle P may be moved to the negative pressure forming device through the particle discharge flow paths 215 and 216, and thus, the particle P may be prevented from escaping from the air cylinder 100 externally.

As illustrated in the schematic operation diagram of FIG. 6, when high-pressure air is supplied to the second space 130, the piston assembly 200 of the air cylinder 100 may rise. When high-pressure air is supplied to the second space 130, pressure may be applied to the first space 120, which may be smaller than the second space 130, and the solid lubricant 240 may be pressed outwardly in the radial direction due to the pressure. In particular, since the solid lubricant 240 is divided into the plurality of portions 240a and 240b, the solid lubricant 240 may be adhered to the inner surface 112 of the cylinder body 110 even though the solid lubricant 240 is not elastic. Therefore, long-term use is possible in a state in which the solid lubricant 240 is provided without continuous supply of lubricant, which may be advantageous for maintenance.

In addition, the particle discharge flow paths 215 and 216 may be connected to a portion of the outer surface between the sealing ring 230 and the solid lubricant 240, and it may be easy to discharge a particle P generated by the sealing ring 230 through the particle discharge flow paths 215 and 216.

When high-pressure air is supplied to the second space 130, air in the first space 120 may press the solid lubricant 240 against the inner surface 112 of the cylinder body 110, some thereof may pass through a space between the portions 240a and 240b of the solid lubricant 240 and may be discharged externally through the particle discharge flow paths 215 and 216, and a remaining portion thereof may be discharged externally through the gas inlet/outlet port 116 while the piston assembly 200 moves upwardly as a whole.

Conversely, even when high-pressure air is supplied to the first space 120, air supplied to the first space 120 may press the solid lubricant 240 against the inner surface 112 of the cylinder body 110, some thereof may pass through a space between the portions 240a and 240b of the solid lubricant 240 and may be discharged externally through the particle discharge flow paths 215 and 216.

Figure 7:
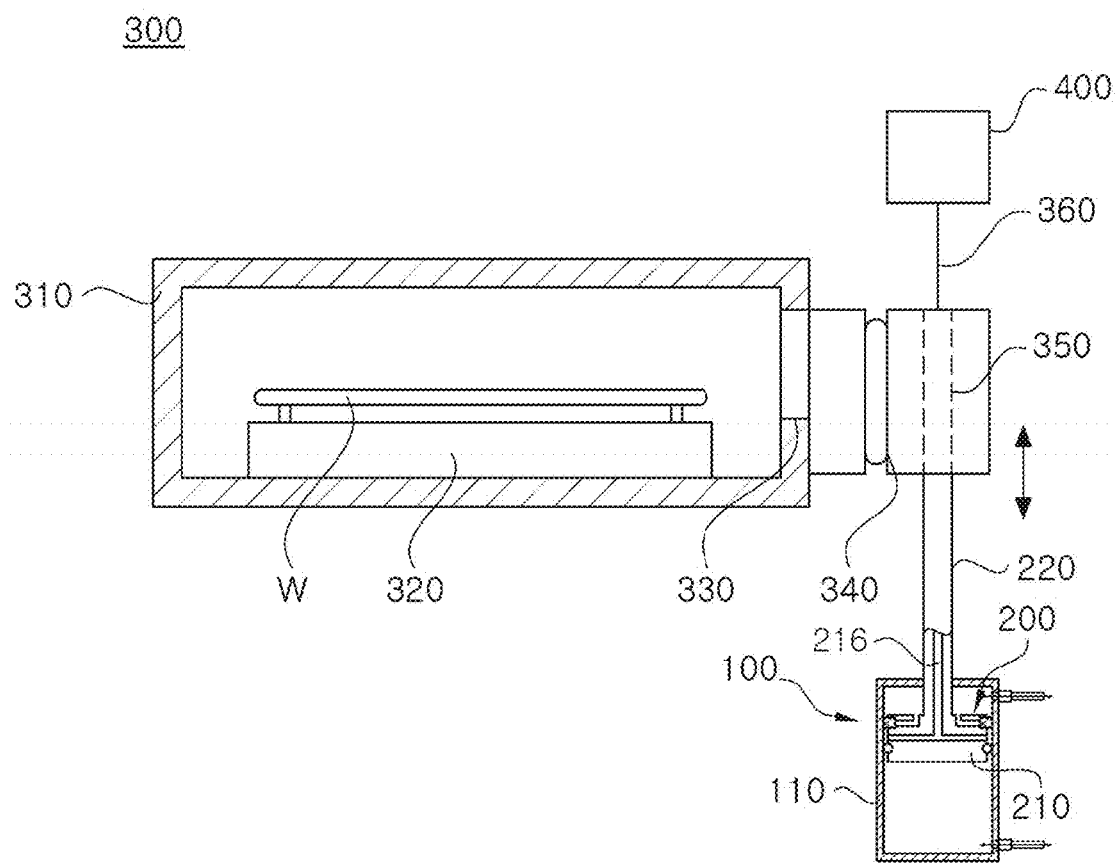
FIG. 7 is a schematic diagram of an apparatus for processing a substrate, equipped with the air cylinder of FIG. 2.

FIG. 7 is a schematic diagram of an apparatus 300 for processing a substrate, equipped with the air cylinder 100 including the piston assembly 200, of the first embodiment described in FIGS. 2 to 6.

An apparatus 300 for processing a substrate may include a chamber 310 in which a support 320 on which a substrate W is seated is disposed, an opening 330 in one side of the chamber 310 through which the substrate W moves by a robot, a door 340 disposed in the opening 330 to block or expose an internal space of the chamber 310 from or to the outside, and an air cylinder 100 connected to the door 340 and moving the door 340. The chamber 310 may be a chamber for processing the substrate W, for example, a baking chamber.

This air cylinder 100 may be the air cylinder 100 of FIG. 2, and the piston rod 220 of the air cylinder 100 may be connected to the door 340. The door 340 has a flow path 350 formed therein, and one side of the flow path 350 may be connected to a suction device or a negative pressure forming device 400, for example, a suction pump, and the other side of the flow path 350 may be connected to the particle discharge flow path 216 formed in the piston rod 220.

The negative pressure forming device 400 may be connected to an exhaust passage configured in a facility, not a separate component. For example, the negative pressure forming device 400 is not limited to the suction device actively forming a negative pressure, and may also include a configuration capable of continuously providing a pressure, lower than an internal pressure of the air cylinder 100, and other configurations may be also applicable as long as air flow is formed by the particle discharge flow paths 215 and 216 of the piston assembly 200 and the flow path 350 of the door 340. A flexible pipe 360 may be connected between the negative pressure forming device 400 and the flow path 350 of the door 340.

Alternatively, the piston rod 220 may not pass through the flow path 350 of the door 340, and may include a connection groove directly connecting the particle discharge flow path 216 and the suction device or the negative pressure forming device 400, to connect the particle discharge flow path 216 and the suction device or the negative pressure forming device 400 through the connection groove.

Figure 8:
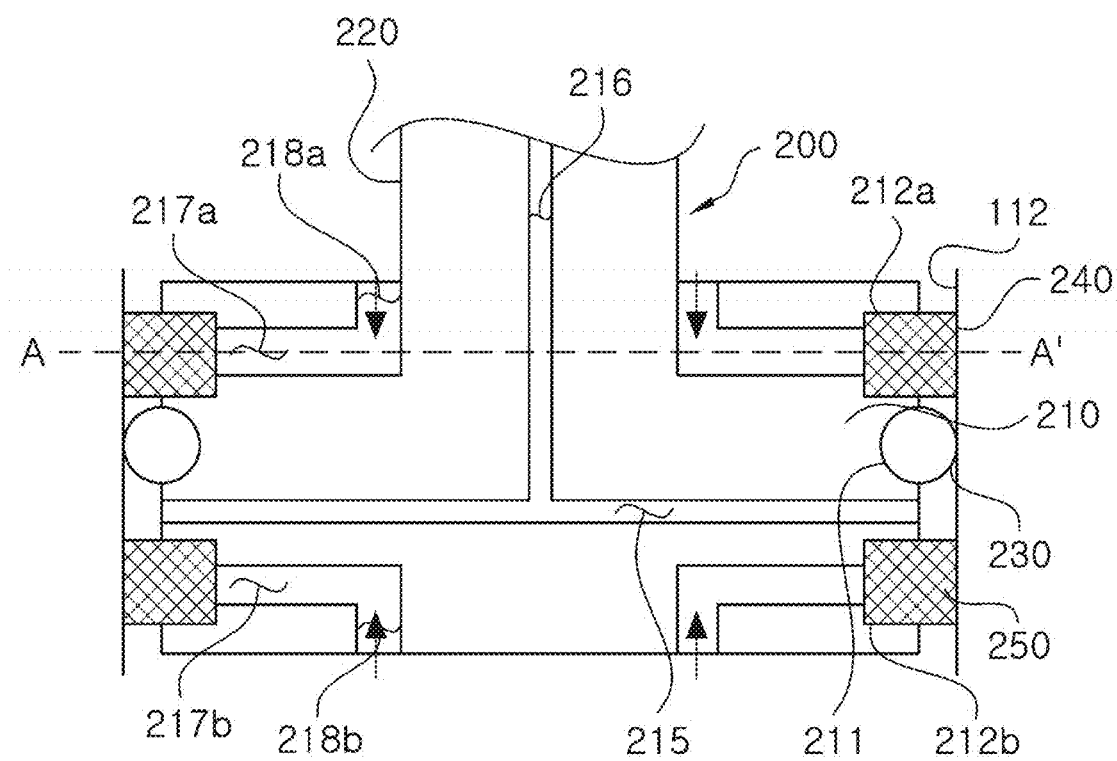
FIG. 8 is a schematic diagram of a piston assembly of a second embodiment of the present disclosure.
Figure 9:
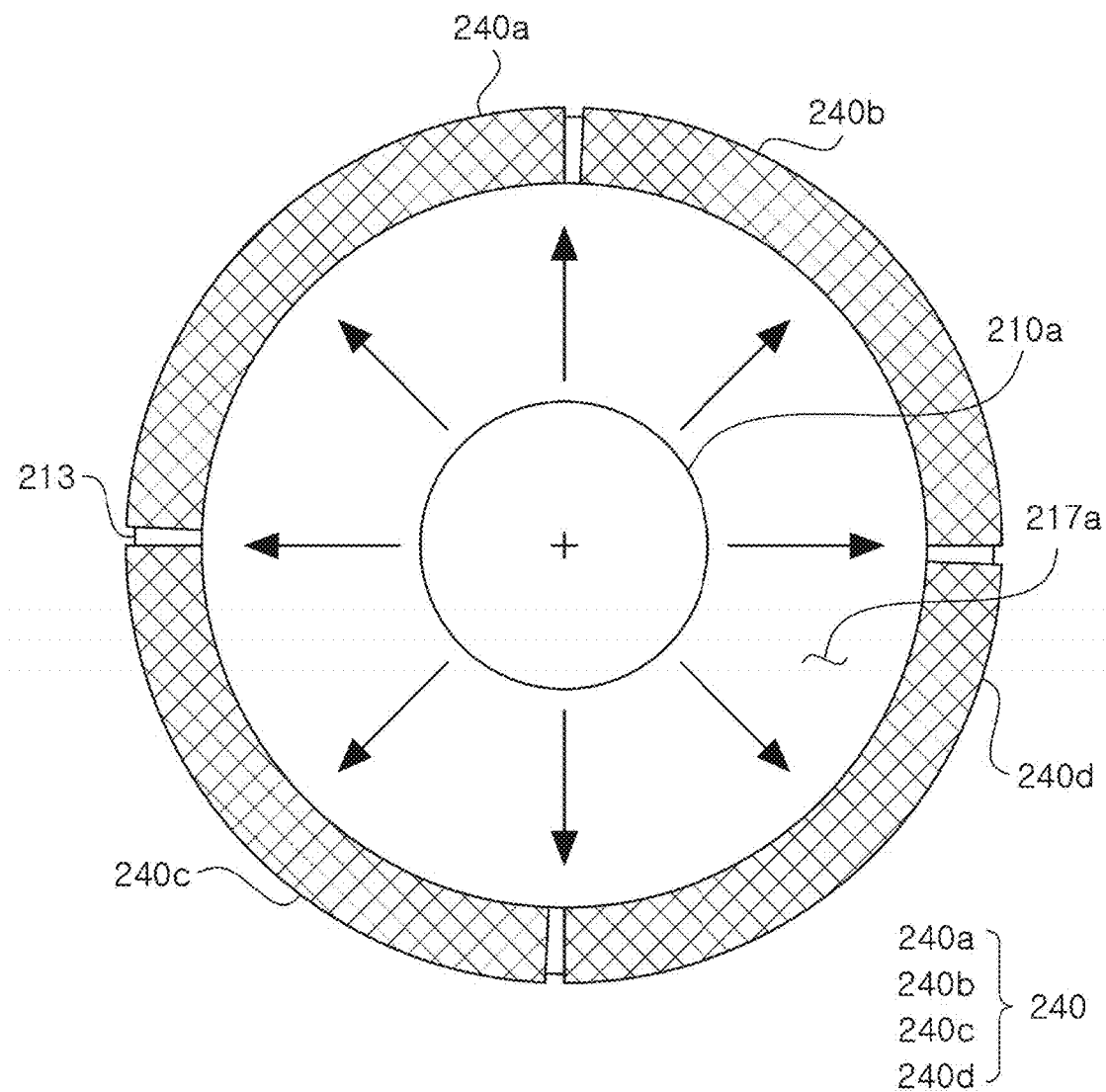
FIG. 9 is a cross-sectional view of FIG. 8, taken along line A-A'.

FIG. 8 is a schematic diagram of a piston assembly 200 according to a second embodiment of the present disclosure, and FIG. 9 is a cross-sectional view of the piston assembly 200 of FIG. 8, taken along line A-A'.

As illustrated in FIGS. 8 and 9, a piston assembly 200 according to a second embodiment of the present disclosure may include a piston body 210 having an outer diameter, smaller than an inner surface 112 of a cylinder body 110, a piston rod 220 connected to a moving direction one side of the piston body 210, e.g., an upper side in FIG. 8, and particle discharge flow paths 215 and 216 extending from the piston body 210 to the piston rod 220, and a first groove 211 concave inward in the radial direction, and second grooves 212a and 212b disposed on both sides of the first groove 211 in the moving direction may be formed on an outer surface of the piston body 210. In this case, the grooves mean that the piston body 210 has a diameter of at least one portion, smaller than the outer diameter of the piston body 210, in the moving direction.

The particle discharge flow paths 215 and 216 may be connected to a portion of an outer surface 213 of the piston body 210 between the first groove 211 and the second groove 212b in an opposite direction of the piston rod 220 from the first groove 211. The particle discharge flow paths 215 and 216 include a first particle discharge flow path 215 extending in the radial direction of the piston body 210, and a second particle discharge flow path 216 extending in the moving direction of the piston assembly 200. The second particle discharge flow path 216 may extend into the piston rod 220 along a center line of the piston assembly 200, and the first particle discharge flow path 215 may connect the second particle discharge flow path 216 and a portion between the outer surface 213 of the piston body 210 and the inner surface 112 of the cylinder body 110. Since the particle discharge flow paths 215 and 216 may be the same as those of the first embodiment, detailed descriptions thereof will be omitted.

The particle discharge flow paths 215 and 216 may be connected to a portion of the outer surface of the piston body 210 between the first groove 211 and the second groove 212a toward the piston rod 220, and may be connected to a portion of the outer surface of the piston body 210 between the first groove 211 and the second grooves 212a and 212b on both sides thereof. When located on both sides, the first particle discharge flow paths 215 may be provided on both sides, and two first particle discharge flow paths 215 may be connected to one second particle discharge flow path 216.

The piston assembly 200 may include a sealing ring 230 disposed in the first groove 211 and a plurality of solid lubricants 240 and 250 respectively disposed in the second grooves 212a and 212b.

Since the sealing ring 230 is the same as that of the first embodiment, a detailed description thereof will be omitted.

As illustrated in FIG. 9, each of the solid lubricants 240 and 250 may have a ring shape as a whole, and may be divided into four portions in the circumferential direction. For example, the solid lubricant 240 may include quarter ring-shaped portions 240a, 240b, 240c, and 240d in FIG. 9, and each of the solid lubricants 240 and 250 may be identical to the solid lubricant 240 of the first embodiment except for a shape thereof.

The second grooves 212a and 212b in which the solid lubricants 240 and 250 are respectively seated may form connection flow paths 217a, 217b, 218a, and 218b, to communicate with a surface of the piston body 210 on which the second grooves 212a and 212b are respectively located, based on the sealing ring 230, in the moving direction.

In the sealing ring 230, the solid lubricant 240 may be disposed in the second groove 212a adjacent to the piston rod 220, and the connection flow paths 217a and 218a may be connected to an inner surface of the second groove 212a on which the solid lubricant 240 is disposed. The connection flow paths 217a and 218a may include a radial direction connection flow path 217a extending radially from the second groove 212a, and a moving direction connection flow path 218a exposed to an upper space in which the piston rod 220 is located while extending in a moving direction from the radial direction connection flow path 217a.

Likewise, in the sealing ring 230, the solid lubricant 250 may be disposed in the second groove 212b farther from the piston rod 220, and the connection flow paths 217b and 218b may be connected to an inner surface of the second groove 212b on which the solid lubricant 250 is disposed. The connection flow paths 217b and 218b may include a radial direction connection flow path 217b extending radially from the second groove 212b, and a moving direction connection flow path 218b exposed to a lower space opposite to the piston rod 220 while extending in a moving direction from the radial direction connection flow path 217b.

In the second embodiment, the solid lubricants 240 and 250 may be disposed on both sides, based on the sealing ring 230 as a center, and the solid lubricants 240 and 250 may be disposed on both sides of the moving direction of the sealing ring 230 in the upward movement and downward movement of the piston assembly 200. The lubricants 240 and 250 may adhere to the inner surface 112 of the cylinder body 110 to provide lubrication, and thus, lubrication performance may be enhanced.

Figure 10:
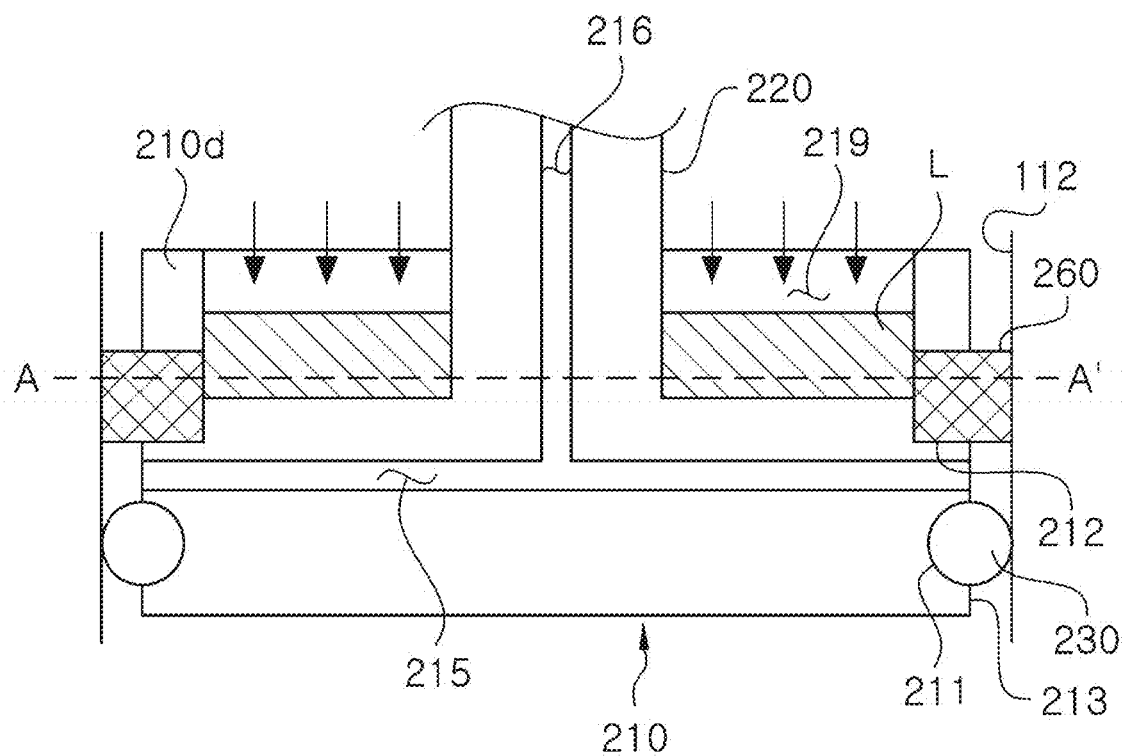
FIG. 10 is a schematic diagram of a piston assembly of a third embodiment of the present disclosure.
Figure 11:
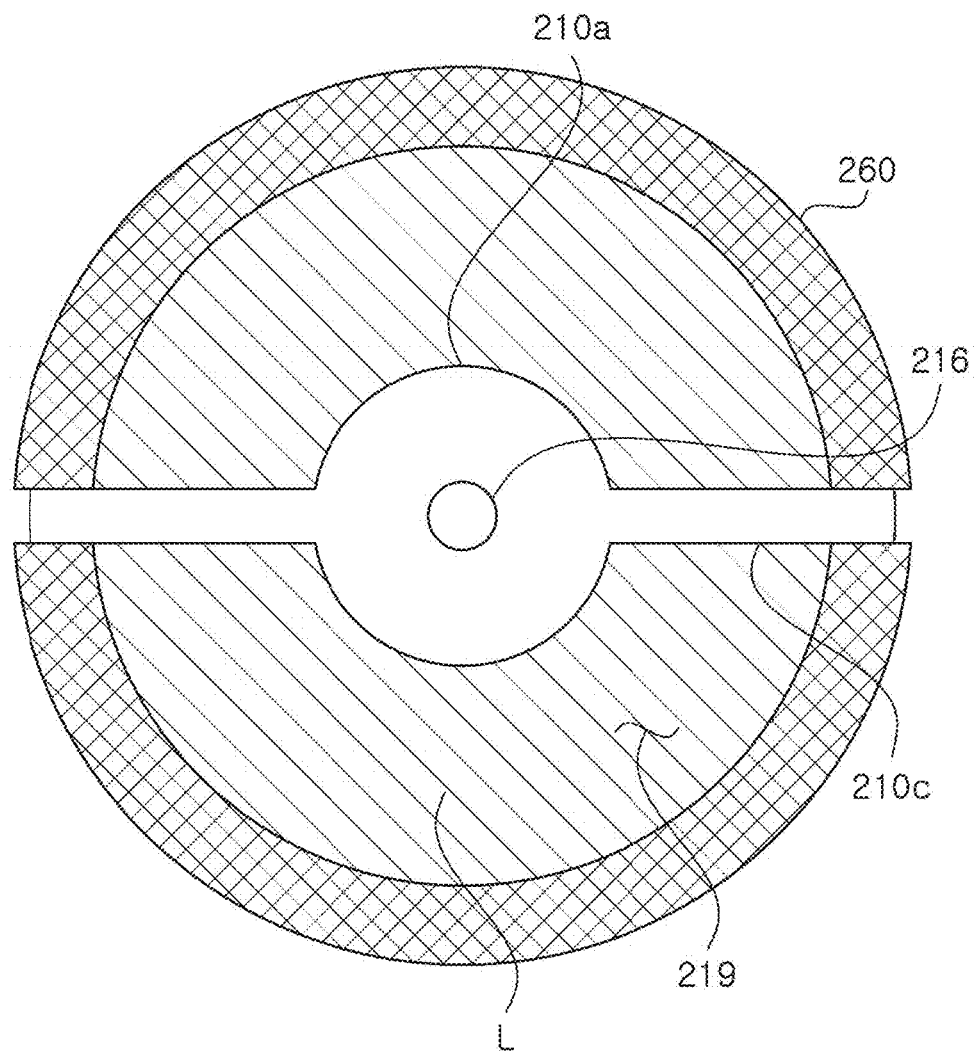
FIG. 11 is a cross-sectional view of FIG. 10, taken along line A-A'.

FIG. 10 is a schematic diagram of a piston assembly 200 according to a third embodiment of the present disclosure, and FIG. 11 is a cross-sectional view of FIG. 10, taken along line A-A'.

The piston assembly 200 according to the third embodiment of the present disclosure may include a piston body 210 having a smaller outer diameter than an inner surface 112 of a cylinder body 110, a piston rod 220 connected to an one side in the moving direction of the piston body 210, e.g., an upper side in FIG. 10, particle discharge flow paths 215 and 216 extending from the piston body 210 to the piston rod 220, a first groove 211 formed concavely radially inward from an outer surface of the piston body 210, a sealing ring 230 disposed in the first groove 211, a second groove 212 formed spaced apart from the first groove 211 in a direction of the piston rod 220, a porous structure 260 disposed in the second groove 212, and a lubricant storage space 219 connected to an inner surface of the second groove 212.

The particle discharge flow paths 215 and 216 may be connected to a portion of the outer surface 213 of the piston body 210 between the first groove 211 and the second groove 212 in an opposite direction of the piston rod 220 from the first groove 211. The particle discharge flow paths 215 and 216 may include a first particle discharge flow path 215 extending in the radial direction of the piston body 210, and a second particle discharge flow path 216 extending in the moving direction of the piston assembly 200. The second particle discharge flow path 216 may extend into the piston rod 220 along a center line of the piston assembly 200, and the first particle discharge flow path 215 may connect the second particle discharge flow path 216 and a portion between the outer surface 213 of the piston body 210 and the inner surface 112 of the cylinder body 110. Since the particle discharge flow paths 215 and 216 are the same as those of the first embodiment, detailed descriptions thereof will be omitted. The lubricant storage space 219 may be formed to be exposed onto a surface of the piston body 210 adjacent to the piston rod 220, e.g., into the first space 120 (see FIG. 2) of the first embodiment, on an inner side of the second groove 212. Specifically, as illustrated in FIGS. 10 and 11, in the piston body 210, the lubricant storage space 219 to which a surface of the piston body 210 adjacent to the piston rod 220 is exposed, may be formed by a portion 210c connecting a ring-shaped portion 210d along the outer surface of the piston rod 220 and a portion 210a extending in the radial direction to connect the ring-shaped portion 210d and the piston rod 220.

The lubricant storage space 219 may be connected to the second groove 212, and the porous structure 260 may be disposed in the second groove 212. A liquid lubricant L may be stored in the lubricant storage space 219. The lubricant storage space 219 may be supplied to the porous structure 260 disposed in the second groove 212 by pressure generated when the piston assembly 200 moves, and the liquid lubricant L supplied by the porous structure 260 may be applied to the inner surface 112 of the cylinder body 110 (see FIG. 2), to provide lubrication to the sealing ring 230.

An upper surface of the lubricant storage space 219 may preferably be exposed such that the liquid lubricant L does not flow outwardly due to gravity.

The porous structure 260 may be any material in which a space is formed therein such that the liquid lubricant L permeates, may have a ring shape as a whole, and may be divided by the portion 210c in the circumferential direction. An outer diameter of the porous structure 260 may be greater than an outer diameter of the piston body 210, and may correspond to the inner surface 112 of the cylinder body 110 (see FIG. 2).

The piston assembly 200 of the third embodiment may include the particle discharge flow paths 215 and 216, similarly to the first and second embodiments, and may discharge a particle P generated by the sealing ring 230 (see FIG. 6) externally, to prevent contamination caused by particles P.

In addition, the piston assembly 200 of the third embodiment may include a lubricant storage space 219 to provide long-term lubrication to the sealing ring 230, and a lubricant storage space 219 may be exposed to the piston rod 220 such that a liquid lubricant L in the lubricant storage space 219 is applied to the inner surface 112 of the cylinder body 110. Therefore, it may be advantageous in maintenance because the liquid lubricant L is continuously supplied, and the applying of the lubricant is performed by moving the piston assembly 200, there is an advantage that no separate management is required.

In the piston assembly 200 of the third embodiment, the porous structure 260 may be disposed on only one side of the sealing ring 230 in moving direction, but as necessary, a solid lubricant 250 together with the porous structure 260 (refer to FIG. 8) may be additionally disposed, and the solid lubricant 250 disposed in the lower portion, in the second embodiment, may be applied to a lower structure of the sealing ring 230 in the third embodiment. For example, the porous structure 260 may be disposed on an upper side of the sealing ring 230 and the solid lubricant 250 may be disposed on the lower side of the sealing ring 230, and the lubricant storage space 219 may be connected to the porous structure 260, and the connection flow paths 217b and 218b (see FIG. 8) may be connected to the solid lubricant 250.

Figure 12:
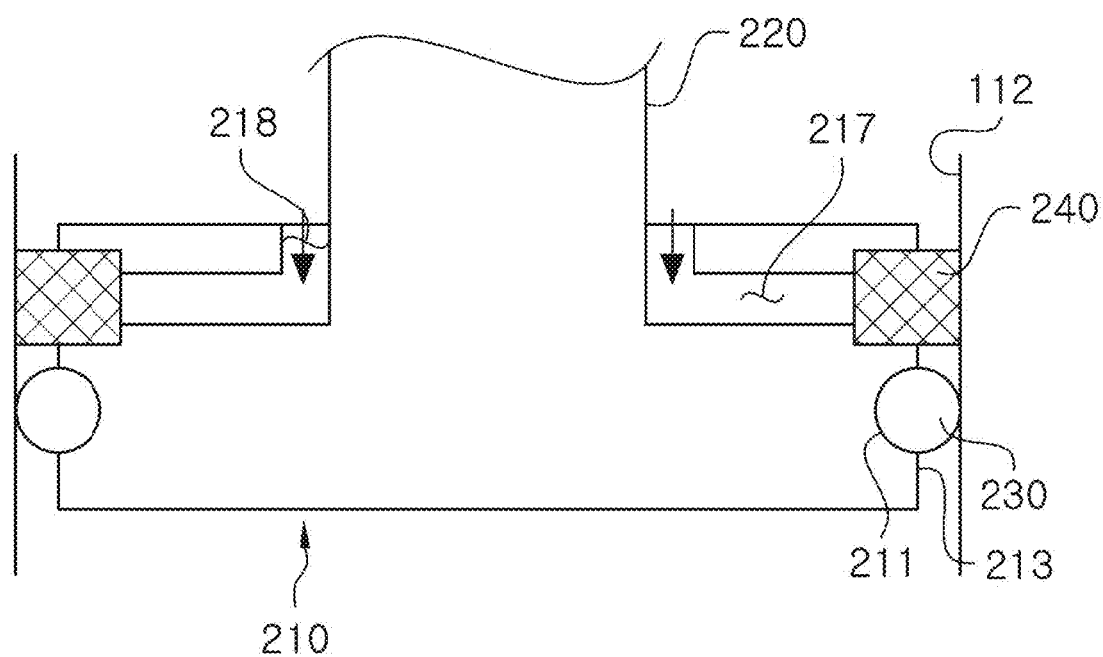
FIG. 12 is a schematic view of a piston assembly of a fourth embodiment of the present disclosure.

FIG. 12 illustrates a schematic diagram of a piston assembly 200 according to a fourth embodiment of the present disclosure.

The piston assembly 200 according to the fourth embodiment may include a piston body 210 disposed in a cylinder body 110, as illustrated in FIG. 2 and having an outer diameter, smaller than an inner diameter of the cylinder body 110, a piston rod 220 connected onto an upper side of the piston body 210, a first groove 211 formed radially inward on an outer surface of the piston body 210, a sealing ring 230 mounted in the first groove 211, a second groove 212 formed to be spaced apart upwardly from the first groove 211, e.g., in a direction in which the piston rod 220 is connected in the moving direction of the piston assembly 200, and a solid lubricant 240 seated on the second groove 212. Connection flow paths 217 and 218 may be formed such that the second groove 212 on which the solid lubricant 240 is seated communicates with a surface of the piston body 210 on which the second groove 212 is located, based on the sealing ring 230, in the moving direction. The solid lubricant 240 may be disposed in the second groove 212 of the sealing ring 230 adjacent to the piston rod 220, and the connection flow paths 217 and 218 may be connected to an inner surface on which the solid lubricant 240 is disposed. The connection flow paths 217 and 218 may include a radial direction connection flow path 217 extending in a radial direction from the second groove 212, and a moving direction connection flow path 218 exposed to an upper portion in which the piston rod 220 is located while extending from the radial direction connection flow path 217 in the moving direction.

In this embodiment, unlike the embodiments of the first to third embodiments, no particle discharge flow path may be provided, and the connection flow paths 217 and 218 may be included to press the solid lubricant 240 against the inner surface of the cylinder utilizing pressure generated when the piston assembly 200 moves. Therefore, the solid lubricant 240 adheres to the inner surface 112 according to movement of the piston assembly 200, to provide lubrication to the sealing ring 230 for a long period of time.

Figure 13:
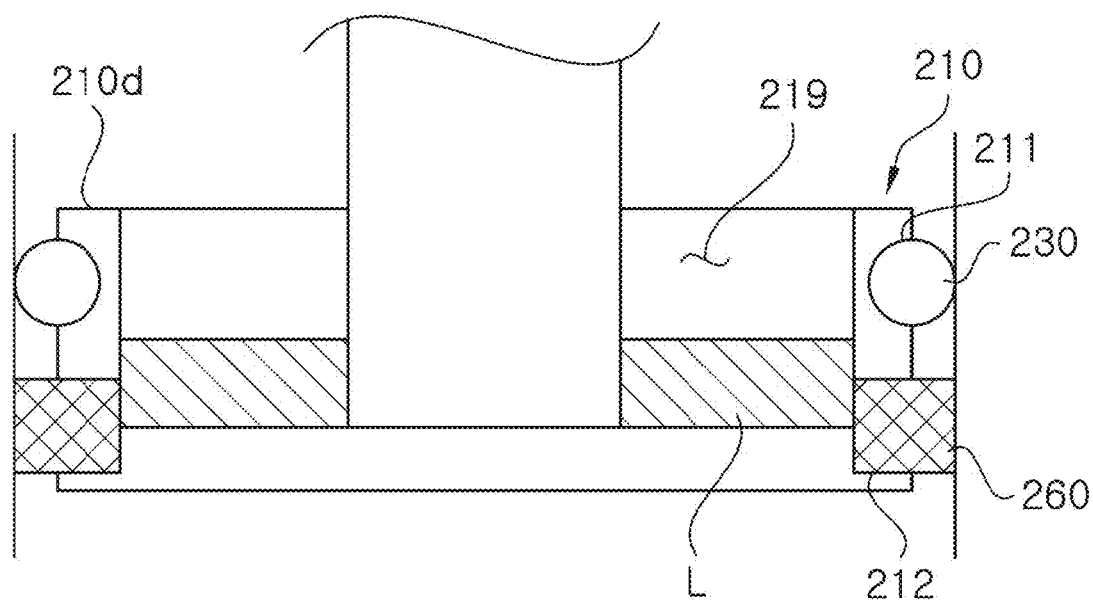
FIG. 13 is a schematic view of a piston assembly of a fifth embodiment of the present disclosure.

FIG. 13 illustrates a piston assembly 200 according to a fifth embodiment. Even in the fifth embodiment, the piston assembly 200 may have the same configuration as the fourth embodiment, but has no particle discharge flow path.

As illustrated in FIG. 13, the piston assembly 200 of the fifth embodiment may include a piston body 210 having a smaller outer diameter than an inner surface 112 of a cylinder body 110, a piston rod 220 connected to one side of the piston body 210 in the moving direction, e.g., an upper side in FIG. 13, a first groove 211 formed concavely radially inward from an outer surface 213 of the piston body 210, a sealing ring 230 disposed in the first groove 211, a second groove 212 formed spaced apart from the first groove 211 in a direction of the piston rod 220, a porous structure 260 disposed in the second groove 212, and a lubricant storage space 219 connected to an inner surface of the second groove 212. A liquid lubricant L may be stored in the lubricant storage space 219.

Since structures of the porous structure 260 and the lubricant storage space 219 in FIG. 13 may be the same as those of the third embodiment of FIG. 10, detailed descriptions thereof will be omitted.

In the fifth embodiment, it is possible to provide the piston assembly 200 capable of continuously providing lubricant even when there is no particle discharge flow path.

Figure 14:
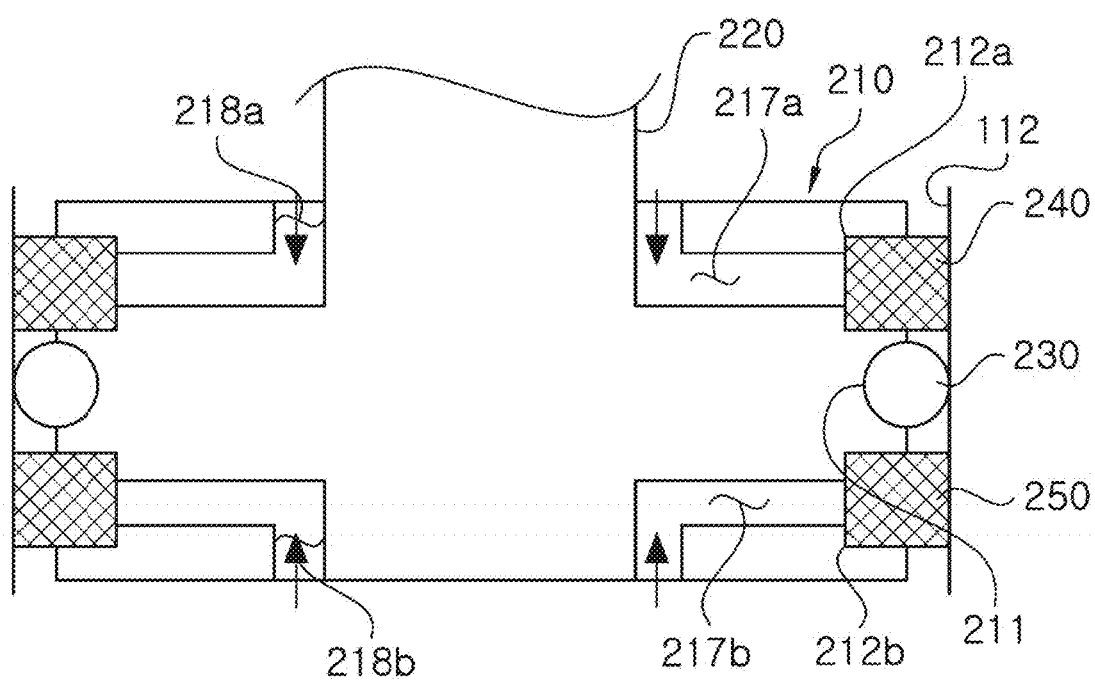
FIG. 14 is a schematic view of a piston assembly of a sixth embodiment of the present disclosure.

FIG. 14 illustrates a piston assembly 200 according to a sixth embodiment. Even in the sixth embodiment, the piston assembly 200 may have the same configuration as the fourth embodiment, but has no particle discharge flow path.

The piston assembly 200 according to the sixth embodiment of the present disclosure may include a piston body 210 having a smaller outer diameter than an inner surface 112 of a cylinder body 110, a piston rod 220 connected to one side of the piston body 210 in the moving direction, a first groove 211 formed concavely radially inward from an outer surface 213 of the piston body 210, a sealing ring 230 disposed in the first groove 211, second grooves 212a and 212b disposed on both sides with the first groove 211 interposed therebetween, solid lubricants 240 and 250 disposed in the second grooves 212a and 212b, and connection flow paths 217a, 217b, 218a, and 218b connected to the second grooves 212a and 212b.

Particle discharge flow paths 215 and 216 may be connected to a portion of an outer surface 213 of the piston body 210 between the first groove 211 and the second groove 212. The particle discharge flow paths 215 and 216 may include a first particle discharge flow path 215 extending in the radial direction of the piston body 210, and a second particle discharge flow path 216 extending in the moving direction of the piston assembly 200. The second particle discharge flow path 216 may extend into the piston rod 220 along a center line of the piston assembly 200, and the first particle discharge flow path 215 may connect the second particle discharge flow path and a portion between the outer surface 213 of the piston body 210 and the inner surface 112 of the cylinder body 110.

In the sealing ring 230, the solid lubricant 240 may be disposed in the second groove 212a adjacent to the piston rod 220, and the connection flow paths 217a and 218a may be connected to an inner surface of the second groove 212a on which the solid lubricant 240 is disposed. The connection flow paths 217a and 218a may include a radial direction connection flow path 217a extending radially from the second groove 212a, and a moving direction connection flow path 218a exposed to an upper space in which the piston rod 220 is located while extending in a moving direction from the radial direction connection flow path 217a.

In the sealing ring 230, the solid lubricant 250 may be disposed in the second groove 212b farther from the piston rod 220, and the connection flow paths 217b and 218b may be connected to an inner surface of the second groove 212b on which the solid lubricant 250 is disposed. The connection flow paths 217b and 218b may include a radial direction connection flow path 217b extending radially from the second groove 212b, and a moving direction connection flow path 218b exposed to a lower space opposite to the piston rod 220 while extending in a moving direction from the radial direction connection flow path 217b.

In the sixth embodiment, the solid lubricants 240 and 250 may be disposed on both sides, based on the sealing ring 230 as a center, and the solid lubricants 240 and 250 may be disposed on both sides in the moving direction of the sealing ring 230 in the upward movement and downward movement of the piston assembly 200. The lubricants 240 and 250 may adhere to the inner surface 112 of the cylinder body 110 to provide lubrication.

In the sixth embodiment, the porous structure 260 of the fifth embodiment may be applied to the piston rod 220, instead of the solid lubricant 240. In this case, a lubricant storage space 219 may be applied, instead of the connection flow paths 217a and 218a.

The present disclosure may provide a piston assembly in which a particle generated in a cylinder does not leak externally by the above configuration, and an air cylinder and an apparatus for processing a substrate, including the piston assembly.

While example embodiments have been illustrated and described above, it will be apparent to those skilled in the art that modifications and variations could be made without departing from the scope of the present disclosure as defined by the appended claims.

What is claimed is:

1. A piston assembly comprising:
a piston body;
a piston rod connected to the piston body;
a first groove formed in an outer surface of the piston body;
a particle discharge flow path extending from an internal space of the piston body to the outer surface of the piston body;
a second groove formed in the outer surface of the piston body to be spaced apart from the first groove in a moving direction of the piston body; and
a first connection flow path connecting an inner side surface of the second groove and a side surface of the piston body in the moving direction, wherein the first connection flow path is connected to a surface of the piston body onto which the piston rod is connected.

2. The piston assembly of claim 1,
wherein the particle discharge flow path is connected to a portion of the outer surface of the piston body between the first groove and the second groove.

3. The piston assembly of claim 1, wherein the particle discharge flow path extends from the piston body to an internal space of the piston rod.

4. The piston assembly of claim 3, further comprising:
a sealing ring disposed in the first groove; and
a solid lubricant disposed in the second groove.

5. The piston assembly of claim 4, wherein the solid lubricant has a ring shape, and is divided into a plurality of portions in a circumferential direction.

6. The piston assembly of claim 5, wherein the first groove is located farther from the piston rod than the second groove in the moving direction.

7. A piston assembly comprising:
a piston body;
a piston rod connected to the piston body;
a first groove formed in an outer surface of the piston body;
a particle discharge flow path extending from an internal space of the piston body to the outer surface of the piston body;
a second groove formed in the outer surface of the piston body to be spaced apart from the first groove in a moving direction of the piston body;
a third groove formed in the outer surface of the piston body to be spaced apart from the second groove, based on the first groove as a center, in an opposite direction; and
a connection flow path connecting an inner side surface of the third groove and the other side surface of the piston body in the moving direction.

8. The piston assembly of claim 2, further comprising:
a sealing ring disposed on the first groove;
a porous structure having a ring shape and disposed on the second groove; and
a lubricant storage space connected to the second groove in an internal space of the second groove,
wherein the lubricant storage space is exposed to a side surface of the piston body in the moving direction.

9. The piston assembly of claim 7, further comprising a third groove formed in the outer surface of the piston body to be spaced apart from the second groove, based on the first groove as a center, in an opposite direction, and
further comprising a second connection flow path connecting an inner side surface of the third groove and the other side surface of the piston body in the moving direction.

10. An air cylinder comprising:
a cylinder body;
a gas inlet/outlet port connected to the cylinder body; and
a piston assembly disposed in the cylinder body,
wherein the piston assembly includes a piston body; a piston rod connected to the piston body; a first groove formed in an outer surface of the piston body; a sealing ring disposed in the first groove; a second groove formed in the outer surface of the piston body to be spaced apart from the first groove in a moving direction of the piston body; a solid lubricant having a ring shape and disposed in the second groove; and a particle discharge flow path extending from an internal space of the piston body to a portion of the outer surface of the piston body adjacent to the first groove,
wherein the particle discharge flow path extends from the piston body to an internal space of the piston rod, and
wherein the solid lubricant has a ring shape, and is divided into a plurality of portions in a circumferential direction.

11. The air cylinder of claim 10, wherein the piston assembly further comprises a first connection flow path connecting an inner side surface of the second groove and a side surface of the piston body in the moving direction.

12. The air cylinder of claim 11, wherein the piston assembly further comprises:
a third groove formed in the outer surface of the piston body to be spaced apart from the second groove, based on the first groove as a center, in an opposite direction; and
a second connection flow path connecting an inner side surface of the third groove and the other side surface of the piston body in the moving direction.

13. The air cylinder of claim 11, wherein the piston assembly further comprises:
a third groove formed in the outer surface of the piston body to be spaced apart from the second groove, based on the first groove as a center, in an opposite direction;
a porous structure having a ring shape and disposed on the third groove; and
a lubricant storage space connected to the third groove in an internal space of the third groove,
wherein the lubricant storage space is exposed to the other side surface in the moving direction of the piston body.

14. The air cylinder of claim 11, wherein the particle discharge flow path is connected to a portion of the outer surface of the piston body between the first groove and the second groove.

15. The air cylinder of claim 11, wherein a first space on one side and a second space on the other side, based on the sealing ring as a center, in the moving direction are formed in the cylinder body,
wherein the gas inlet/outlet port is connected into the first and second spaces, respectively.

16. An apparatus for processing a substrate, comprising:
a chamber including an opening through which the substrate enters and exits;
a door opening and closing the opening of the substrate processing chamber; and
an air cylinder connected to the door,
wherein the air cylinder is the air cylinder of claim 12.

17. The apparatus of claim 16, wherein the door communicates with the particle discharge flow path and includes a communication path connected to a suction device or a negative pressure forming device.

* * * * *